US006323448B1

(12) United States Patent
Seymour et al.

(10) Patent No.: US 6,323,448 B1
(45) **Date of Patent: *Nov. 27, 2001**

(54) CIRCUIT BREAKER STAB CONTACT ASSEMBLY WITH SPRING CLIP

(75) Inventors: Raymond K. Seymour, Plainville, CT (US); Anapam Tiwari, Mumbai (IN); Frederick W. Glabau, Kensington; Michael C. Guerrette, Bristol, both of CT (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,341

(22) Filed: Dec. 22, 1999

(51) Int. Cl.[7] ........................ H01H 1/00; H01H 11/04; H02B 1/04

(52) U.S. Cl. ........................ 200/237; 200/250; 200/282; 200/284; 29/622

(58) Field of Search ........................ 200/237, 238, 200/250, 280, 282, 284; 335/8–10, 16, 147, 201; 361/634–640; 439/221; 29/622

(56) References Cited

U.S. PATENT DOCUMENTS

| | | | | |
|---|---|---|---|---|
| 3,271,549 | * | 9/1966 | Gelzheiser | 200/250 |
| 3,333,078 | * | 7/1967 | Gelzheiser et al. | 200/275 |
| 3,383,486 | * | 5/1968 | Powell | 200/250 |
| 3,402,328 | * | 9/1968 | Gryctko | 361/635 |
| 3,950,071 | * | 4/1976 | McGann et al. | 439/221 |
| 4,016,386 | * | 4/1977 | Gelzheiser et al. | 200/250 |
| 4,468,547 | * | 8/1984 | Belttary | 200/294 |

* cited by examiner

*Primary Examiner*—J. R. Scott
(74) *Attorney, Agent, or Firm*—Cantor Colburn LLP; Carl B. Horton

(57) ABSTRACT

A stab assembly (41) in which a spring clip (24) and a conductor member (16) define a pair of engagement surfaces for engaging a stab blade (12). The conductor member (16) has an opening (34) to allow for the insertion of an extended surface of the spring clip (24). Once in position, the spring clip (24) and conductor member (16) are frictionally engaged and define a channel (126) that will accept and hold a stab blade (12). The stab assembly (14) is retained within a molded case circuit breaker (10) and provides electrical contact between a bus bar and the circuit breaker.

20 Claims, 2 Drawing Sheets

CIRCUIT BREAKER STAB CONTACT ASSEMBLY WITH SPRING CLIP

BACKGROUND OF THE INVENTION

The present invention relates generally to electrical distribution equipment, and more particularly to a stab assembly for arc fault circuit breakers that are installed in load centers.

Arc fault circuit breakers are well known, and are used throughout electrical distribution systems to interrupt electrical power supplied to protected loads by electrical busway systems. These circuit breakers function as a manual switch, whereby the breakers disconnect or connect electrical power to the load equipment they are protecting when they are manually opened or closed. The circuit breakers are also equipped with a tripping unit that is capable of automatic interruption and isolation of the protected load from the bus upon the sensing of an electrical fault such as over current and arc-fault conditions. The circuit breaker enclosure, which is generally a molded plastic case, houses the tripping unit. The tripping unit monitors the circuit, and opens the circuit breaker if a fault condition occurs.

Circuit breakers are located in load centers, which contain a power bus and a plurality of cubicles, and which are designed to accept one or more circuit breakers. The cubicles in the load centers function to properly locate and structurally support the circuit breakers. When it is necessary to protect a new load, a circuit breaker is added to an available cubicle in a load center, and conductors are installed from the load to the circuit breaker. Circuit breakers may readily be removed and relocated within the load center as needed to properly supply the protected circuits with electrical current. Because of the diversity of power requirements and associated protection required by different loads, the size and configuration of each circuit breaker may vary.

Although the circuit breaker rating and configuration may vary among the loads connected to the circuit breakers in the load center, each circuit breaker must be configured so as to allow secure insertion into a cubicle in the load center. Proper insertion requires physical contact between the bus and the circuit breaker so that current can pass through the circuit breaker to the load.

Circuit breakers physically mate with stab blades that are electrically connected to the load center. The stab blades conduct the current from the load center to a fixed contact on the circuit breaker. These stab blades are short, stiff conducting metal bars that center the circuit breaker, provide physical support for the circuit breaker, and provide a conducting surface that allows current to flow from the load center to the circuit breaker. The circuit breaker requires a snug fit between the stab blade and the circuit breaker fixed contact in order to function properly. If the fit is not snug, hot spots can occur on the stab blade or fixed contact, and arcing between the stab blade and the fixed contact can result. Hot spots and arcing cause degradation of the circuit breaker, the stab, and/or the load center.

Typical stab assembly designs use a spring plug-in connection to a central stab blade to connect the circuit breaker to the load center. These designs do not lend themselves to be used except in either a right hand (the contact is located to the right of the stab blade), or a left hand configuration (the contact is located to the left of the stab blade). Two separate configurations require at least four separate parts: typically, a left contact, a left spring, a right contact, and a right spring.

Further, the assembly process precludes automated pre-assembly because the stab assembly falls apart unless assembled in the circuit breaker case where the parts are trapped. In addition, the prior art does not fully utilize economies to be gained from using common parts.

SUMMARY OF THE INVENTION

In an exemplary embodiment, the present invention comprises a circuit breaker stab assembly having a contact, the contact having a contact top portion and a conductor member angularly offset from the contact top portion. The contact top portion and the conductor member define an aperture. A spring clip in the stab assembly preferably has a spring clip top portion with a first surface and a second surface extending from the first surface. A first extension is preferably angularly offset from the first surface and a second extension angularly offset from the second surface, with the second extension extending through the aperture in the contact. Further, the second extension is preferably in intimate engagement with the conductor member.

DETAILED DESCRIPTION OF THE INVENTION

Figure 1:
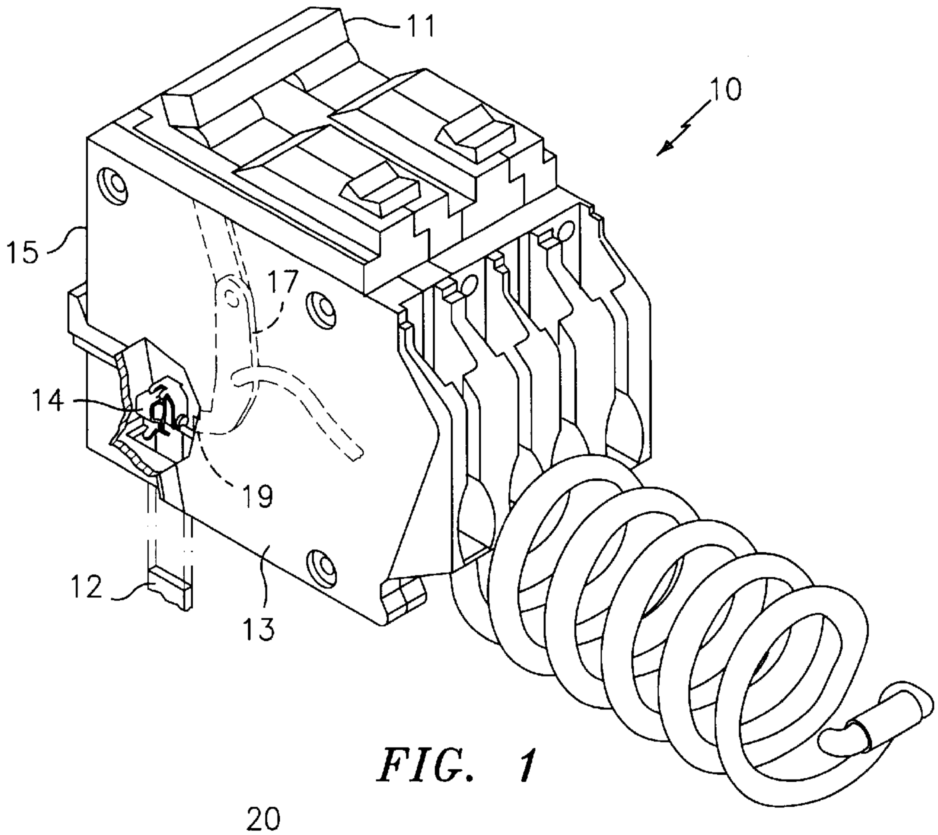
FIG. 1 is a perspective view of a circuit breaker, including a stab assembly embodying the present invention.

Referring to FIG. 1, an exemplary embodiment of a circuit breaker prior to insertion into a load center is shown generally at 10 in relation to a stab blade 12. The stab blade 12 is in a fixed location within a cubicle (not shown) of a load center.

The circuit breaker 10 provides an electrical current path from an electrical bus via stab blade 12, to a protected load when a movable contact arm 17 is in a closed position. The movable contact arm 17 can be manually set to the closed position, and will move to an open position if a current fault is detected in the circuit. The movable contact arm 17 may also be manually switched to the open position.

A movable contact 19 is disposed on movable contact arm 17, and is controlled either by electronic controls located within the circuit breaker housing 13 of the circuit breaker 10, or a manual switch 11 protruding from the circuit breaker housing 13. A stab assembly 14 is located inside the circuit breaker housing 13 approximate an upper end 15, and is disposed between the movable contact 19 and the stab blade 12. Stab assembly 14 provides an electrical connection between movable contact and stab blade 12, when movable contact arm 17 is in the closed position.

Figure 2:
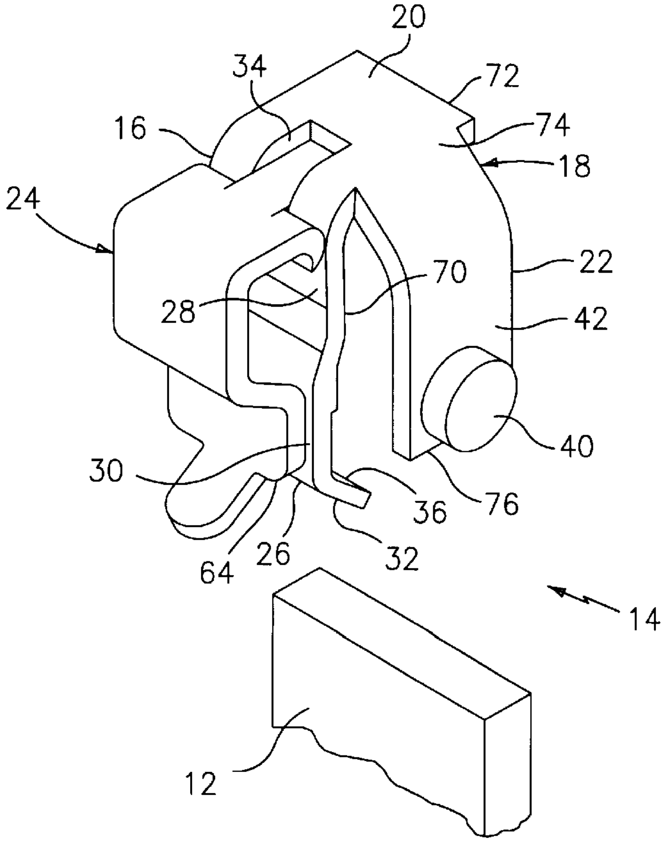
FIG. 2 is a perspective view of the stab assembly of FIG. 1.

Referring now to both FIG. 1 and FIG. 2, an exemplary embodiment of an assembled stab assembly is shown generally at 14. The stab assembly comprises a contact 18 and a spring clip 24 that are disposed in intimate and secure contact by friction. The stab assembly 14 is positioned within the housing of the circuit breaker 10 with the spring clip 24 and the contact 18 accessible through a centrally located opening in the circuit breaker upper end 15. The opening in the circuit breaker 10 allows the stab blade 12 to enter a channel 26 between the spring clip 24 and the contact 18. Stab blade 12 is frictionally engaged within channel 26, thereby providing the electrical connection between stab blade 12 and stab assembly 14.

Contact 18 comprises a contact top portion 20, a contact arm 22, and the conductor member 16, which is adapted to receive the spring clip 24. When assembled, the conductor member 16 and the spring clip 24 define the channel 26 for accepting the stab blade 12.

The contact arm 22 extends downward from the contact top portion 20, and is further aligned generally perpendicular to the conductor member 16. The contact top portion 20 is disposed between the conductor member 16 and contact arm 22, with both the conductor member 16 and the contact arm 22 depending from the contact top portion 20. A tang 72 extends from an end 74 of the contact top portion 20 approximate the contact arm 22. A generally cylindrical contact protrusion 40 is attached to an outer surface 42 of the contact arm 22 proximate to a distal end 76 of the contact arm 22. Contact protrusion 40 contacts movable contact 19 when movable contact arm 17 is in the closed position, thereby creating the electrical connection between stab assembly 14 and movable contact 19.

The conductor member 16, which has an outer surface 28, extends generally perpendicularly downward from the contact top portion 20. The conductor member 16 steps outwardly at the outer surface 28 from which it then extends further downward and forms a channel wall 30. An inward extension 32 of the conductor member 16 at an entrance 64 to the channel 26 provides a chamfered surface for guiding the stab blade 12 into the channel 26.

An aperture 34 is defined at the boundary between the contact top portion 20 and the conductor member 16. The aperture 34 is sized to allow the spring clip 24 to enter the aperture 34 in order to position the spring clip 24 in locking relationship with the contact 18. A knee channel 36 is defined in the inner surface 70 of the conductor member 16. The knee channel 36 is preferably rectangular or a similar geometry and is laterally positioned on the opposite side of the conductor member 16 from the channel wall 30, extending along the inner surface 70. The knee channel 36 has a predetermined width and depth that allow the knee channel to engage a knee 38 (see FIG. 3) of the spring clip 24.

Figure 3:
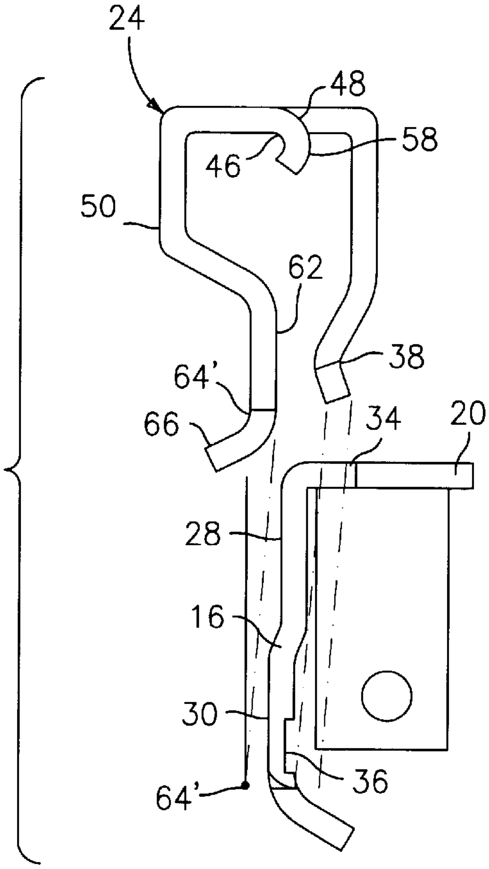
FIG. 3 is a side elevational view of the stab assembly of one embodiment of the present invention, illustrating components in a disassembled condition.
Figure 4:
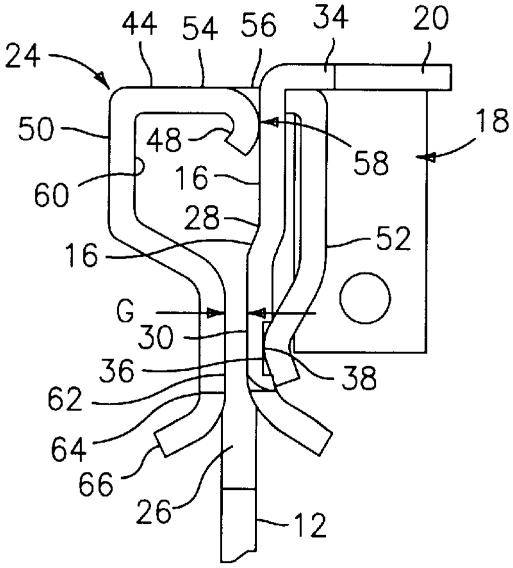
FIG. 4 is a side elevational view of the stab assembly of FIG. 3, illustrating components in an assembled condition.

Referring now to FIGS. 3 and 4, the spring clip 24 consists of a unitary conducting material shaped to cooperate with the conductor member 16 of the contact 18 to form the channel 26 when assembled with the contact 18. The spring clip 24 comprises a spring clip top portion 44, a first extension 50 and a second extension 52.

The spring clip top portion 44 of the spring clip 24 comprises a rectangular planar first surface 54 and a narrow rectangular planar second surface 56 extending therefrom. The second surface 56 is a predetermined size to pass through the aperture 34 of the contact 18. The first surface 54 includes a downward bend 48 located at the boundary between the first surface 54 and second surface 56. A first surface 58 of the bend 48 faces toward the outer surface 28 of the conductor member 16, providing a detent which both supports and positions the spring clip 24 in contact with the conductor member 16.

The first extension 50 of the spring clip 24 having a first surface 60 extends generally perpendicularly downward from the first surface 54 of the spring clip top portion 44 opposite the second surface 46 of bend 48. The first extension 50 depends angularly inward at the first surface 60, and then extends further downward forming a channel wall 62. A spring tab 66 extending from the first extension 50 at the entrance 64 of channel 26 provides a chamfered surface extending outward for guiding the stab blade 12 into the channel 26. The first extension 50 of the spring clip 24 is generally the same width as the conductor member 16 of the contact 18.

The second extension 52 of the spring clip 24 depends perpendicularly downward from the second surface 56 of the spring clip top portion 44 opposite the first surface 58 of bend 48. The second extension 52 of the spring clip 24 is generally the same width as the second surface 56 of the spring clip top portion 44 of the spring clip 24, both being sized to pass into and through the aperture 34. The second extension 52 includes an inward knee 38 distally located from the spring clip top portion 44.

Referring now to FIG. 3, before attachment, the spring clip 24 is in its unstrained configuration. With the spring clip 24 in its unstrained configuration, the entrance 64' at the channel wall 62 of the first extension 50 is positioned at a sufficient offset (e.g. about 5° or another angle appropriate with the particular geometry) from the entrance 64 of the channel 26 after it is assembled. The knee 38 is similarly sufficiently offset (e.g. by approximately 5°) for being accepted into the aperture 34 in the contact top portion 20 and for further acceptance into the knee channel 36.

With the 5° offset, for example, the surface 58 of the bend 48 contacts the outer surface 28 of the conductor member 16 with the knee 38 snapping into the knee channel 36 thereby forming channel 26, which has generally parallel walls 30, 62. The magnitude of the frictional force of the stab channel 26 on the stab blade 12 is proportional to the displacement of the spring tab 66 by the stab blade 12. The size and specific geometry of channel 26 can change according to size and geometry of stab blade 12, with a typical size being about 0.03 inches to about 0.09 inches thick and about 0.2 to about 0.4 inches deep.

An exemplary embodiment of the assembled stab assembly is shown in FIG. 4. Knee channel 36 is positioned to engage the knee 38 when the stab assembly 14 is fully assembled. The surface 58 of the bend 48 is in contact with the outer surface 28 of the conductor member 16, while the knee 38 snaps into the knee channel 36 and is retained in the knee channel 36 after the spring clip 24 and the contact 18 are assembled.

A channel wall 62 of the first extension 50 defines a stab channel 26 with the channel wall 30 of the conductor member 16. Stab channel 26 comprises a gap "G" serving as a lead-in for the stab blade 12 when the stab assembly 14 is assembled. The width of the stab channel 26 is less than the thickness of the stab blade 12, and the stab channel 26 frictionally engages the stab blade 12. The strength of the frictional engagement is proportional to the displacement of the first extension 50 of the spring clip 24 upon inserting the stab blade 12. The strength of the frictional engagement and the size of the gap is thereby determined by the position of the knee 38, the location of the surface 58 of the bend 48, the location of the channel wall 62 of the first extension 50 of the spring clip 24, and the length of the stab channel 26.

The contact 18 is constructed from hard, rigid, conductive material to provide a bearing surface when the stab blade 12 is urged against the conductor member 16 by the spring tension. The material also provides structural support for a contact protrusion 40 disposed on the contact arm 22. Possible contact materials include metals such as copper and others, as well as alloys and composites thereof. Possible spring clip materials include metals such as steel, ferrous materials, and alloys and composites thereof, with spring steel and spring bronze preferred.

It is to be appreciated that, when assembled, the second extension 52 of the spring clip 24 is elastically deformed, which results in a tensile force. The tensile force seats the knee 38 in the knee channel 36. With the knee 38 seated in the knee channel 36, the surface 58 of the bend 48 is urged against the outer surface 28 of the conductor member 16, thus retaining the spring clip 24 in locking engagement with the contact 18. The frictional engagement within the stab channel 26 provides the structural support required for firmly attaching the circuit breaker in its cubicle within the load center, and results in a sure electrical contact.

The stab assembly is illustrated in the "right" configuration in FIGS. 1 and 2, i.e., the contact arm 22 is located to the right of the conductor member 16, and in the "left" configuration in FIGS. 3 and 4, so that the second extension 52 may be viewed in FIGS. 3 and 4.

An advantage of the present stab assembly is that only three separate parts are required: a right contact, a left contact and a common spring clip 24. The right contact and the left contact are mirror-image versions of the contact 18, while the spring clip is the described spring clip 24 in both cases. A further advantage is the economy gained by using a common spring clip. The present invention allows the stab assembly to be assembled using automated means, since the press fit simply requires an insertion of spring clip 24 through the aperture 34 in the contact and since the parts are frictionally bound, thus enabling insertion into the circuit breaker housing without separating.

While the preferred embodiments have been shown and described, various modifications and substitutions may be made thereto without departing from the spirit sand scope of the invention. Accordingly, it is to be understood that the present invention has been described by way of illustration and not limitation.

What is claimed is:

1. A circuit breaker stab assembly, comprising:

a contact having a contact top portion and a conductor member angularly offset from the contact top portion, whereby the contact top portion and the conductor member define an aperture; and a spring clip having a spring clip top portion with a first surface and a second surface extending from the first surface, a first extension angularly offset from the first surface, a second extension angularly offset from the second surface, the second extension extending through the aperture in the contact and in intimate engagement with the conductor member.

2. The circuit breaker stab assembly of claim 1, wherein:

the conductor member comprises an inner surface which faces the second extension, the inner surface of the conductor member defining a knee channel; and wherein the second extension comprises a knee that is in intimate engagement with the knee channel.

3. The circuit breaker stab assembly of claim 1, wherein the first extension has a spring tab extending away from the conductor member, and the conductor member has an inward extension extending away from the first extension.

4. The circuit breaker stab assembly of claim 3 wherein the first extension and the conducting member define a channel adapted to frictionally receive a stab blade, and wherein the spring tab and the inward extension define a chamfered opening adapted for guiding a stab blade within the channel, the chamfered opening being larger in width than the channel.

5. The circuit breaker stab assembly of claim 1 further comprising a contact arm angularly offset from the contact top portion.

6. The circuit breaker stab assembly of claim 5 further comprising a contact protrusion disposed against said contact arm.

7. The circuit breaker stab assembly of claim 5 wherein the contact top portion and the contact arm comprise substantially perpendicular planar surfaces, the contact top portion and the conductor member comprise substantially perpendicular planar surfaces, and the conductor member and the contact arm comprise substantially perpendicular planar surfaces.

8. The circuit breaker stab assembly of claim 5, wherein the contact arm is positioned on a right-hand side of the conductor member in a right hand configuration and is positioned on a left-hand side of the conductor member in a left hand configuration.

9. The circuit breaker stab assembly of claim 1, wherein the first extension and the conducting member define a channel adapted to frictionally receive a stab blade.

10. The circuit breaker stab assembly of claim 1 wherein the spring clip further comprises a pair of bends angularly offset from the first surface of the spring clip top portion, the bends located on opposite sides of the second surface of the spring clip top portion, the bends in intimate engagement with the conductor member.

11. The circuit breaker stab assembly of claim 10 wherein the second extension intimately engages an inner surface of the conductor member and the bends intimately engage an outer surface of the conductor member.

12. A method for making a circuit breaker stab assembly comprising the steps of providing a spring clip having a spring clip top portion with a first surface and a second surface extending from the first surface, a first extension angularly offset from the first surface, and a second extension angularly offset from the second surface, providing a contact having a contact top portion and a conductor member angularly offset from the contact top portion, whereby the contact top portion and the conductor member define an aperture;

inserting the second extension through the aperture, intimately engaging the second extension with the conductor member, and, retaining the spring clip and contact together through frictional engagement.

13. The method of claim 12, wherein the conductor member comprises an inner surface which faces the second extension, the inner surface of the conductor member defining a knee channel; and wherein the second extension comprises a knee, wherein the step of intimately engaging the second extension with the conductor member comprises the step of snapping the knee into the knee channel.

14. The method of claim 12 further comprising the step of selecting either a left configuration or a right configuration for the circuit breaker stab assembly, and the method comprising the subsequent additional step of angularly offsetting a contact arm on a right hand side of the conductor member if a right configuration is selected or angularly offsetting a contact arm on a left hand side of the conductor member if a left configuration is selected.

15. The method of claim 12 wherein the spring clip further comprises a pair of bends angularly offset from the first surface of the spring clip top portion, the bends located on opposite sides of the second surface of the spring clip top portion, the method comprising the step of intimately engaging the bends with the conductor member.

16. The method of claim 15 wherein the steps of intimately engaging the second extension with the conductor member and intimately engaging the bends with the conductor member comprise the step of sandwiching the conductor member between the second extension and the bends.

17. A circuit breaker comprising:

a circuit breaker housing; and, a stab assembly positioned within the housing, wherein the stab assembly comprises a contact having a contact top portion and a conductor member angularly offset from the contact top portion, whereby the contact top portion and the conductor member define an aperture; and a spring clip having a spring clip top portion with a first surface and a second surface extending from the first surface, a first extension angularly offset from the first surface, a second extension angularly offset from the second surface, the second extension extending through the aperture in the contact and in intimate engagement with the conductor member.

18. The circuit breaker of claim 17 wherein the stab assembly further comprises a contact arm angularly offset from the contact top portion.

19. The circuit breaker of claim 17 wherein the first extension and the conducting member define a channel adapted to frictionally receive a stab blade.

20. The circuit breaker of claim 17 wherein the spring clip further comprises a pair of bends angularly offset from the first surface of the spring clip top portion, the bends located on opposite sides of the second surface of the spring clip top portion, the bends in intimate engagement with the conductor member.

* * * * *